US012450288B2

(12) United States Patent
Roy et al.

(10) Patent No.: US 12,450,288 B2
(45) Date of Patent: Oct. 21, 2025

(54) SCALABLE, TRANSPORTABLE, AND SELF-CONTAINED BINARY STORAGE FORMAT FOR EXTENSIBLE MARKUP LANGUAGE

(71) Applicant: Oracle International Corporation, Redwood Shores, CA (US)

(72) Inventors: Harichandan Roy, Amarillo, TX (US); To-Ju Huang, Redwood City, CA (US); Jose Omar Alvizo Flores, Foster City, CA (US); Zhen Hua Liu, San Mateo, CA (US); Francisco Alonso Alavez Sosa, Zapopan (MX); Qin Yu, Belmont, CA (US); Madhupriya Ravishankar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/611,857

(22) Filed: Mar. 21, 2024

(65) Prior Publication Data
US 2025/0298843 A1 Sep. 25, 2025

(51) Int. Cl.
*G06F 16/84* (2019.01)
*G06F 16/81* (2019.01)
*G06F 16/83* (2019.01)
*G06F 16/93* (2019.01)

(52) U.S. Cl.
CPC .............. *G06F 16/86* (2019.01); *G06F 16/81* (2019.01); *G06F 16/93* (2019.01)

(58) Field of Classification Search
CPC ........... G06F 16/86; G06F 16/81; G06F 16/93

USPC ......................................................... 707/756
See application file for complete search history.

(56) References Cited

U.S. PATENT DOCUMENTS

| 10,769,209 | B1 * | 9/2020 | Saliba ..................... G06F 16/86 |
| 2003/0023628 | A1 * | 1/2003 | Girardot ................. G06F 9/547 715/202 |
| 2003/0046317 | A1 * | 3/2003 | Cseri ..................... G06F 40/117 715/234 |
| 2004/0172627 | A1 * | 9/2004 | Ramani .................... G06F 8/36 717/162 |
| 2008/0098002 | A1 * | 4/2008 | Mehta ..................... G06F 16/86 |
| 2016/0246784 | A1 * | 8/2016 | Chakerian .............. G06F 16/282 |
| 2018/0062832 | A1 * | 3/2018 | Hatcher ............... H04L 63/0428 |
| 2021/0081389 | A1 * | 3/2021 | Liu ................... G06F 16/24552 |

* cited by examiner

*Primary Examiner* — Kuen S Lu
(74) *Attorney, Agent, or Firm* — Hickman Becker Bingham Ledesma LLP; Stephen R. Tkacs (57) ABSTRACT

A structured document storage format is provided in which tokens used for encoding and decoding are contained within the encoded document in an inline dictionary. Each document is encoded independently, and there is no central dependency or any dependency on other documents during DML and query execution. Each encoded document has all information with it on disk so that the document can be independently shared, decoded, or distributed. A mechanism is provided for quickly determining a mapping between tags and tokens without having to scan the entire inline token dictionary for each document. This allows the database system to process multiple documents, each having its own inline token dictionary, without having to fully scan the inline dictionary of every document for each tag that referenced in an operation.

20 Claims, 8 Drawing Sheets

```
OFFSET| BINXML ENCODING              | DIAGNOSTICS
------+------------------------------+-----------------------
     0| 9F                           | STRTSEC
      | 01                           |   binxml version: 1
      | 63                           |   binxml flags
      |                              |        1: NOINTOK
      |                              |        2: NOSCHREF
      |                              |       20: SUMMARY
      |                              |       40: BIG_ENDIAN
     3| 9E                           | DOC
      | 00                           |
      | 00 00                        |   doc flags
     7| C0                           |   PRPT2L1
      | 07                           |   DATSTR8
      | 5C 01                        |     token # 5c01
      | 74 65 73 74 20 64 6F 63      |     [test doc]
    19| A0                           | ENDSEC
```

```
OFFSET| BINXML ENCODING            | DIAGNOSTICS
------+---------------------------+------------------------------
     0| 9F                         | STRTSEC
      | 02                         |   binxml version: 2
      | 42                         |   binxml flags
      |                            |     2: NOSCHREF
      |                            |    40: BIG_ENDIAN
     3| F8                         | METAL1
      | 08                         |   metadata length: 8
      | 01                         |   metadata type: TOKENS_OFFSET
      | 00 00 00 00 00 00 00 0E    |   offset to token def
    14| F9                         | METAL4
      | 00 00 00 08                |   metadata length: 8
      | 02                         |   metadata type: TOKENS_DEF
      | 01                         |   tokendef flags
      |                            |     1: ELEM_NONMSPC
      | 00                         |   # nmspc: 0
      | 00 01                      |   # qname: 1
      |                            |   elem #1
      | 03                         |     local length: 3
      | 64 6F 63                   |     local [doc]
    28| 9E                         | DOC
      | 00                         |
      | 00 00                      |   doc flags
    32| F3                         | PRPT1L1
      | 07                         |   DATSTR8
      | 01                         |   elem #1
      |                            |     local [doc]
      | 74 65 73 74 20 64 6F 63    | [test doc]
    43| A0                         | ENDSEC
```

| instruction | description | opcode | operands |
|---|---|---|---|
| | | | data |
| DATSTR[1..64] | string | 00..3F | [1..64]-byte AL32UTF8 string |
| DATBIN[1..32] | binary data | 40..5F | [1..32]-byte binary data |
| DATNM[1..21] | decimal number | 60..74 | [1..21]-byte Oracle NUMBER |
| DATINT[1,2,4,8] | integer | 75..78 | [1,2,4,8]-byte integer |
| DATUINT[1,2,4,8] | unsigned integer | 79..7C | [1,2,4,8]-byte unsigned integer |
| DATFLT[4,8] | floating-point number | 7D,7E | [4,8]-byte floating-point number |
| DATODT | Oracle date | 83 | 7-byte Oracle DATE |
| DATOTS | Oracle timestamp | 84 | 11-byte Oracle DATETIME |
| DATOTSZ | Oracle timestamp w/ TZ | 85 | 13-byte Oracle DATETIME |
| DATBOL | Boolean | 86 | 1-byte Boolean |
| DATQNM | QName | 87 | 8-byte QName ID |
| DATEMPT | empty | 8F | N/A |

*FIG. 5B*

| instruction | description | opcode | L | operands | |
|---|---|---|---|---|---|
| | | | | type/len (L bytes) | data (N bytes) |
| DATAL2 | string or binary data w/ 2-byte typ/len code | 8A | 2 | 2 MS bits for type: 0 = string 1 = hexBinary 2 = base64Binary Remaining bits for data length (N) | N-bytes AL32UTF8 string if type = 0 N-bytes binary data if type = 1 or 2 |
| PRTDATA | continued string or binary data (w/ 4-byte typ/len code) | E4 | 4 | | |
| DATAL8 | string or binary data w/ 8-byte typ/len code | 8B | 8 | | |

FIG. 5C

| instruction | description | opcode | L | operands length (L bytes) | version/type (1-byte) | flags | data (N bytes) |
|---|---|---|---|---|---|---|---|
| DOC | XML document | 9E | 1 | always 0 (N) | N/A | 2-byte flags:<br>0x0001: prolog standalone clause present<br>0x0002: XML prolog present<br>0x0004: prolog encoding clause present (encoding value is ignored)<br>0x0008: prolog version clause present<br>0x0010: standalone="yes"<br>0xFF00: XML version (0x1100 = XML 1.1) | N/A |
| STRTSEC | start encoding section | 9F |  | N/A | CSX version:<br>1 = CSX<br>2 = TBX | 1-byte flags:<br>0x02: no schema reference (always on for TBX)<br>0x40: big-endian encoding (always on) |  |
| ENDSEC | end encoding section | A0 |  |  |  | N/A |  |
| METAL[1,4] | metadata | F8,F9 | 1,4 | metadata length (N) | metadata type:<br>1 = offset to token defs<br>2 = token defs | N/A | metadata type = 1:<br>N-byte integer for offset<br>metadata type = 2:<br>N-byte token def metadata |

FIG. 5D

| instruction | description | opcode | K | operands type/len | token ID | flags | data |
|---|---|---|---|---|---|---|---|
| PRPT[1,2,4,8]L1 | leaf property | F3,C0,C2,C4 | 1/2/4/8 | DAT opcode | k-byte token ID | N/A | DAT data |
| PRPT[1,2,4,8]L2 |  | F4,C1,C3,C5 |  | DATAL2 type/len |  |  | DATAL2 data |
| PRPSTT[1,2,4,8] | property start | F5,C8,C9,CA |  | N/A |  |  | N/A |
| PRPSTT[1,2,4,8]F | property start w/flags | F6,CD,CE,CF |  | N/A |  | 1-byte flags:<br>0x02: w/type ID<br>0x08: w/ prefix ID<br>0x20: mixed mode |  |
| PRPSTT[1,2,4,8]V | property start w/ flags & IDs | F7,D2,D3,D4 |  | 1 byte:<br>2 (if w/ type ID) +<br>4 (if w/ prefix ID) |  |  | 4-byte type ID (if present) and 2-byte prefix ID (if present) |
| ENDPRP | property end | D9 |  |  |  | N/A |  |

SCALABLE, TRANSPORTABLE, AND SELF-CONTAINED BINARY STORAGE FORMAT FOR EXTENSIBLE MARKUP LANGUAGE

FIELD OF THE INVENTION

The present invention relates to storing structured document data in a format that is efficient and self-contained and, more particularly, a format that does not depend on a central repository or schema, for a robust, distributed, and scale-out solution.

BACKGROUND

Extensible Markup Language (XML) is a markup language and file format for storing and transmitting data. XML defines a set of rules for encoding documents such that they are both human-readable and machine-readable. In database management systems (DBMSs), XMLType is designated as a system-defined opaque data type for handling XML data. Database tables can have columns of XMLType into which XML documents can be inserted. In some implementations, a DBMS stores XML data as a binary large object (LOB or BLOB) and uses a number of member functions to make the data available to structured query language (SQL) operators.

In the era of cloud computing, with data becoming more schema-less and volumes reaching unprecedented magnitudes, the landscape of storing, processing, and sharing data is going through a transformation. Compact Schema-aware Binary XML (CSX) is a post-parse, binary format designed specifically for XML data. The biggest advantage of CSX is that it can be used for XML schema-based documents or for documents that are not based on an XML schema. While the CSX storage format serves as a solution for schema-aware, space-efficient storage, the CSX storage format has some serious limitations that impairs its use for sharding, sharing, and scaling. One drawback for CSX is that it may be strongly coupled with XML schema. Another drawback is that CSX maintains a central token repository for all XML documents for encoding/decoding. Therefore, it would be advantageous to have a robust and schema-less storage solution for XML empowering customers to distribute, share, shard, and scale an XML database in a seamless way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5C is a table describing document and metadata instructions for the TBX storage format in accordance with an illustrative embodiment.

FIG. 5D is a table describing property instructions for the TBX storage format in accordance with an illustrative embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a binary structured storage format that is efficient and self-contained. The illustrative embodiments are described with respect to a Transportable Binary XML (TBX) storage format; however, aspects of the illustrative embodiments can be applied to other structured storage and data interchange formats, such as the JavaScript Object Notation (JSON) format, for example. The TBX storage format is a schema-less storage format. The schema repository is consulted when encoding schema-based documents. This occurs when attempting to encode typed node values into more compact representations. However, encoded documents contain no schema information, thus allowing the decoder to proceed without knowing anything about the schema. Thus, as the documents are encoded in a schema-less way, there is no need to consult a central XML schema repository at query or decode time. As a result, there is a time saving for both Data Manipulation Language (DML) and query operations, because accessing a central schema repository and parsing the schema are no longer involved in either case. The XML schema is used only for validation and encoding.

The illustrative embodiments also eliminate the central token repository. With the CSX storage format, all the tokens used for encoding/decoding are stored in a global central token repository and the encoded documents are stored in the user table. As data grows, the central token repository becomes a bottleneck in many ways. Moreover, because encoded documents and tokens are stored separately, data sharing, transfer, and sharding are very restricted. In the TBX storage format of the illustrative embodiments, the tokens used for encoding and decoding are inlined within the encoded document. As a result, it is unnecessary to maintain any token repository, because each encoded document is self-contained. The TBX format essentially provides a document-level encoding granularity. Each document is encoded independently, and there is no central dependency or any dependency on other documents during DML and query execution. Each encoded document has all information with it on disk so that the document can be independently shared, decoded, or distributed.

Another problem encountered with CSX is the token conflict issues during XML data distribution. Sometimes, it takes an unexpectedly long time to resolve, which negatively affects customer satisfaction. The TBX format of the illustrative embodiments does not have a central token repository; therefore, there is no potential for conflict. Therefore, the TBX format makes XML data distribution very smooth.

Inlining token definitions within an encoded document inevitably increases the size of the encoded document. Thus, some embodiments include optimizations to save space. One optimization is to allow tokens to be represented by one byte. Because the inline token dictionary includes token definitions for only one document, most documents will encode fewer than 256 tokens. Thus, each token can be represented using the UB1 datatype to store an unsigned value of one byte. Prior solutions use UB4 or UB8, because they need at least four or eight bytes to represent the tokens for all documents in the central token repository. Therefore, allowing a token to be represented by a single byte can significantly decrease the size of the encoded document.

Another optimization is to recognize whether a text value of a leaf node in a document is a number, date, or timestamp and then use an appropriate datatype to store that value. Thus, one embodiment detects when a given value is a number, date, or timestamp. The value is then represented in the encoded document using the corresponding datatype instruction, such as binary number, decimal number, integer, unsigned integer, floating-point number, date, timestamp, timestamp with time zone, or Boolean. (However, for numeric literals, this is only possible when XML schema is consulted.) This represents significant savings in storage space. For example, the number 65,499 can be stored as five or six text characters, each using at least one byte, depending on the text encoding; however, the number 65,499 can be stored as a two-byte integer. Therefore, detecting and converting values to the appropriate datatype can result in significant savings in storage.

The illustrative embodiments also provide a mechanism for quickly determining a mapping between tags/attributes and tokens without having to scan the entire inline token dictionary for each document. The first time a database system encounters a tag/attribute when performing an operation on an encoded document, the system scans the inline dictionary for the tag/attribute to identify a token associated with the tag/attribute and create an entry in a cache, mapping the tag/attribute to the identified token. The next time the database system encounters that tag/attribute, when performing an operation using the same document or a different encoded document, the system uses the cache entry to determine the associated token, looks up the token in the inline dictionary, and determines whether the token is associated with the tag/attribute in the current document. If the token is associated with the tag/attribute in the inline dictionary of the current document, then the database system uses the token to decode the tag/attribute in the document; otherwise, the database system updates the cache entry. This allows the database system to process a plurality of documents, each having its own inline token dictionary, without having to fully scan the inline dictionary of every document for each tag/attribute that referenced in an operation.

Tags and higher-level attributes will be more likely to have matching entries in the inline dictionary, even in multiple documents. Therefore, there may be a savings on the initial reference to a given tag/attribute if a cache entry has the correct association between the tag/attribute and a token. Some documents will repeat a tag/attribute many times, and there will a significant savings for these repeated references to the same tag/attribute, because each subsequent lookup within the same document will indicate that the cache entry has the correct association, thus reducing the number of necessary dictionary scans.

The TBX storage format of the illustrative embodiments is extremely robust. The TBX format makes distribution hassle-free with no token conflicts. The TBX storage format also allows efficient sharing among containers or shards, thus getting rid of back-and-forth conversion between binary formats and texts. Sharding is made possible because the TBX storage format has document-level encoding granularity with no global repository dependency. Each shard can process TBX documents independently. Scaling out XML databases is also possible using sharding or partitioning. Furthermore, with the TBX storage format, client-side processing is feasible without limitations, thus reducing pressure on the database server. Documents that are encoded using the TBX storage format may consume more space compared to previous solutions; however, the above-mentioned optimizations address this issue. Any potential increase in storage space is outweighed by the benefits of improved efficiency, scalability, and distribution.

Binary XML with Central Token Repository

Figure 1:
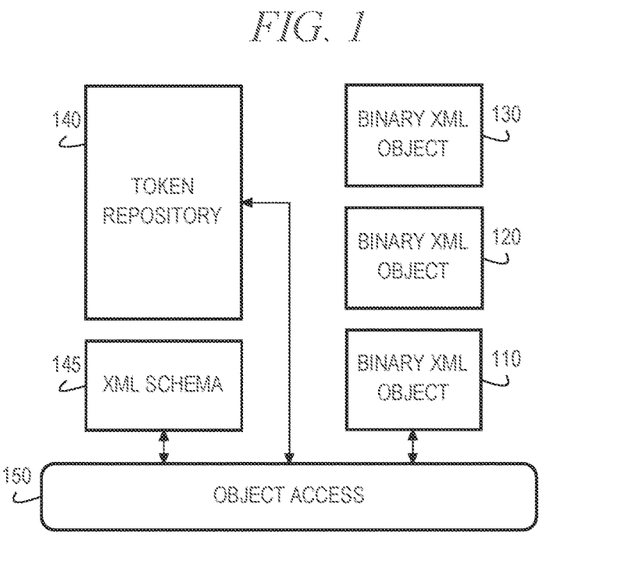
FIG. 1 is a block diagram illustrating access of Binary XML objects with a centralized token repository.

FIG. 1 is a block diagram illustrating access of Binary XML objects with a centralized token repository. Binary XML is compact, post-parse, schema-aware XML storage format that stores the metadata used to encode or decode XML data in a central table. In FIG. 1, a database system performs access 150 on binary XML objects 110, 120, 130, which have been imported into the database system. In the depicted example, binary XML objects 110, 120, 130 are Compact Schema-aware XML (CSX) objects, each of which is an XML document, which can be in XML typed column of a table. Performing an access 150 on an object, such as binary XML object 110, may involve decoding object 110, performing a query on object 110, or performing a DML operation on object 110.

Each Binary XML object 110, 120, 130 may be based on XML Schema, which specifies the structure, content, and certain semantics of XML documents. The World Wide Web Consortium (W3C) Schema Working Group publishes a particular XML schema, often referred to as the schema for schemas, that provides the definition, or vocabulary, of the XML Schema language. An XML schema definition, also called an XML schema, an XML document that is compliant with the vocabulary defined by the schema for schemas. Thus, when performing access 150, the database system consults XML Schema 145.

Also, in the depicted example, Binary XML objects 110, 120, 130 are encoded such that tags/attributes are replaced by tokens, thus making objects 110, 120, 130 more compact. The characters making up an XML document are divided into markup and content, which may be distinguished by the application of simple syntactic rules. Generally, strings that constitute markup either begin with the character "<" and end with a ">". Strings of characters that are not markup are content. A tag is a markup construct that begins with "<" and ends with ">". There are three types of tag: start-tag (e.g., <section>), end-tag (e.g., </section>), and empty-element tag (e.g., <line-break/>). While tags are described herein, tokens can also be used for XML attributes.

Figure 2:
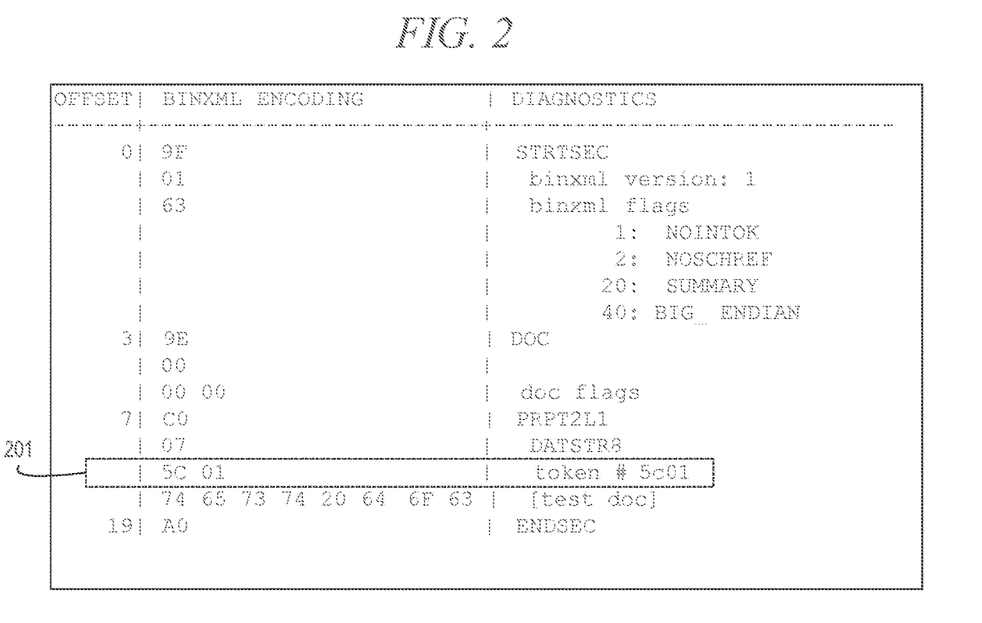
FIG. 2 depicts an example encoded Binary XML object.

FIG. 2 depicts an example encoded Binary XML object. The example shown in FIG. 2 represents the following XML document:

<doc>test doc</doc>

In this case, the tags <doc></doc> are markup and the text string, "test doc," is the content. The resulting encoded document in hexadecimal is as follows: 9F 01 63 9E 00 00 00 C0 07 5C 01 74 65 73 74 20 64 6F 63 A0.

The encoded document includes opcodes, flags, and properties to represent metadata for the document, such as version, number of bytes in a section, and the like. Opcodes and operands of the opcodes are shown in FIGS. 5A-5D, as will be discussed in further detail below.

In the example shown in FIG. 2, the metadata is encoded from offset 0 to 2, and the document is encoded from offset 3 to offset 19. The encoded object starts with the opcode 9F. As shown in FIG. 5C, opcode 9F indicates the STRTSEC instruction for the start of an encoding section. This opcode has one byte (01) for the version type (CSX) and one byte (63) for flags. The document starts at offset 3 with the opcode 9E. As shown in FIG. 5C, opcode 9E indicates the DOC instruction for the start of an XML document. This opcode has one byte for length (always 00) and two bytes (00 00) for flags.

Figure 5A:
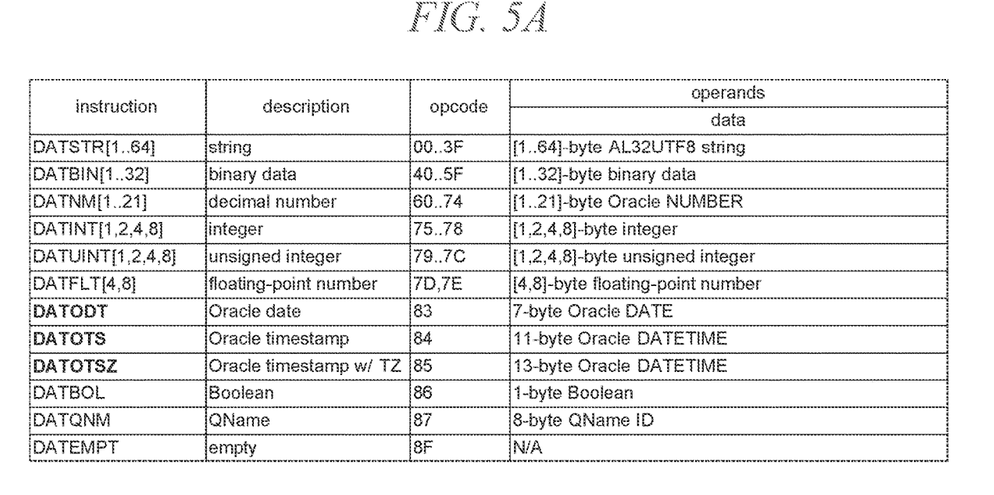
FIG. 5A is a table describing fixed-length data instructions for the TBX storage format in accordance with an illustrative embodiment.

Next, the <doc></doc> tags and corresponding content are encoded with a section starting with opcode C0. As shown in FIG. 5D, opcode C0 indicates the PRPT2L1 instruction for a leaf property with a single-byte DAT opcode, a 2-byte token ID, and a data operand corresponding to the DAT opcode. A "property" may be a tag (or element) or an attribute. The single-byte DAT opcode is 07, which according to the table in FIG. 5A, is a DATSTR8 instruction for a string. The 07 opcode indicates an 8-byte string in AL32UTF8 character set. As seen in FIG. 2, the 2-byte token ID is 5C 01. The content "test doc" is encoded as text with 74 being the letter "t", 65 being the letter "e", 73 being the letter "s", and so on. Finally, the document ends with opcode A0, which according to the table in FIG. 5C, indicates the ENDSEC instruction for the end of the document.

In the example shown in FIG. 2, the <doc></doc> tags, which require 11 bytes of text, are encoded using a 2-byte token 201. Such representation saves storage significantly. However, the savings can be even more significant with more complex tags. For example, XML tags may use XML namespaces for complex documents. A namespace is a set of signs (names) that are used to identify and refer to objects of various kinds. A namespace ensures that all of a given set of objects have unique names so that they can be easily identified. Element names are defined by the developer. This often results in conflicts when XML documents from different XML applications are mixed. Name collisions in XML can easily be avoided using a namespace prefix. The namespace name is usually applied as a prefix to the local name. Thus, a qualified name (qname) includes a namespace prefix and a local name. In the Java™ programming language, identifiers that appear in namespaces have a short (local) name and a unique long "qualified" name, referred to as a "qname" herein, for use outside the namespace.

In practice, a Binary XML object can include a large number of complex tags that can repeat many times. These tags can be very lengthy. For example, some developers may use complex naming conventions for tags, increasing the number of characters per tag. For example, there may be an order element with a tag <order>; however, the developer may append the date and time to each order to distinguish among various orders, e.g., <order202312010800>. Encoding more complex tags will result in much greater savings in storage.

In order to perform access 150, the database system must consult token repository 140. For example, when decoding the Binary XML document shown in FIG. 2, the database system must look up in token repository 140 to determine the tag associated with the token 5C 01. As another example, if a query or other operation refers to the tag <doc>, then the database system must look up the token repository 140 to determine the token associated with the <doc> tag. Thus, there will be an entry in token repository 140 that associates the token 5C 01 with the <doc></doc> tags. Token repository may use a hash table to look up a tag to determine the corresponding token. Looking up a tag may be a nearly constant time operation, regardless of the size of token repository 140. It creates the hash of the key, then proceeds to find the location associated with the hashed value. If a collision is encountered, then a collision resolution algorithm may be used to find the actual value.

The size of token repository 140 is constrained by the size of the token. For example, a two-byte token (16 bits) can have 65,536 different values; therefore, the number of unique tags that can be used for all Binary XML objects 110, 120, 130 would be constrained to 65,536 tags. For a larger number of Binary XML objects and for more complex documents, a larger number of tags must be kept in token repository 140, also resulting in more bytes being required for each token. As data grows, the central token repository becomes a bottleneck in many ways.

Moreover, because encoded documents and tokens are stored separately, data sharing, transfer, and scaling are very restricted. A binary XML object cannot be transferred from one machine to another without replicating the entire token repository on both machines for decoding of the object or accessing the objects. This would require the token repository 140 to include entries for all tags of all documents on all machines, which is not feasible for most use cases.

Transportable Binary XML with Inline Token Dictionary

Figure 3:
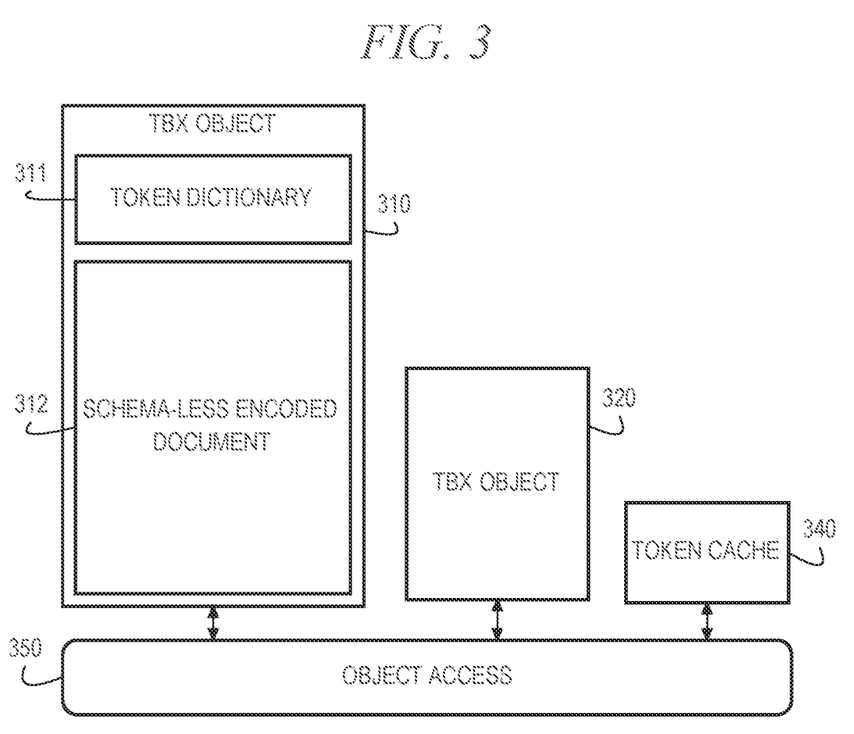
FIG. 3 is a block diagram illustrating access of Transportable Binary XML objects with an inline token dictionary in accordance with an illustrative embodiment.

FIG. 3 is a block diagram illustrating access of Transportable Binary XML objects with an inline token dictionary in accordance with an illustrative embodiment. In FIG. 3, a database system performs access 350 on Transportable Binary XML (TBX) objects 310, 320, which have been imported into the database system. In the depicted example, TBX objects 310, 320 are XML documents kept in XML-Type tables or columns. Performing an access 350 on an object, such as TBX object 310, may involve decoding object 310, performing a query on object 310, or performing a DML operation on object 310.

Schema-Less Format

In these embodiments, each TBX object 310, 320 is schema-less. The RDBMS consults XML Schema repository when encoding a schema-based document; however, the resulting encoded TBX object is schema-less. As a result, time is saved for both DML and query operations, because accessing a central schema repository and parsing schema are no longer required. However, XML Schema can be used for encoding and validation.

Inline Token Dictionary

In accordance with an illustrative embodiment, each TBX object, e.g., object 310, includes an inline token dictionary 311 and a schema-less encoded document 312. Each token in the encoded document 312 has a corresponding entry in token dictionary 311 that associates the token with a tag.

Unlike a centralized token repository, token dictionary 311 includes entries for only the tokens in encoded document 312 and not for tokens in TBX object 320, and TBX object 320 includes an inline token dictionary (not shown) for only the tokens in TBX object 320. Thus, TBX objects 310, 320 are encoded at a document-level encoding granularity. In other words, each TBX object 310, 320 is encoded independently. Each encoded TBX object has all necessary information along with it on disk such that it can be independently shared, decoded, or distributed.

Figure 4:
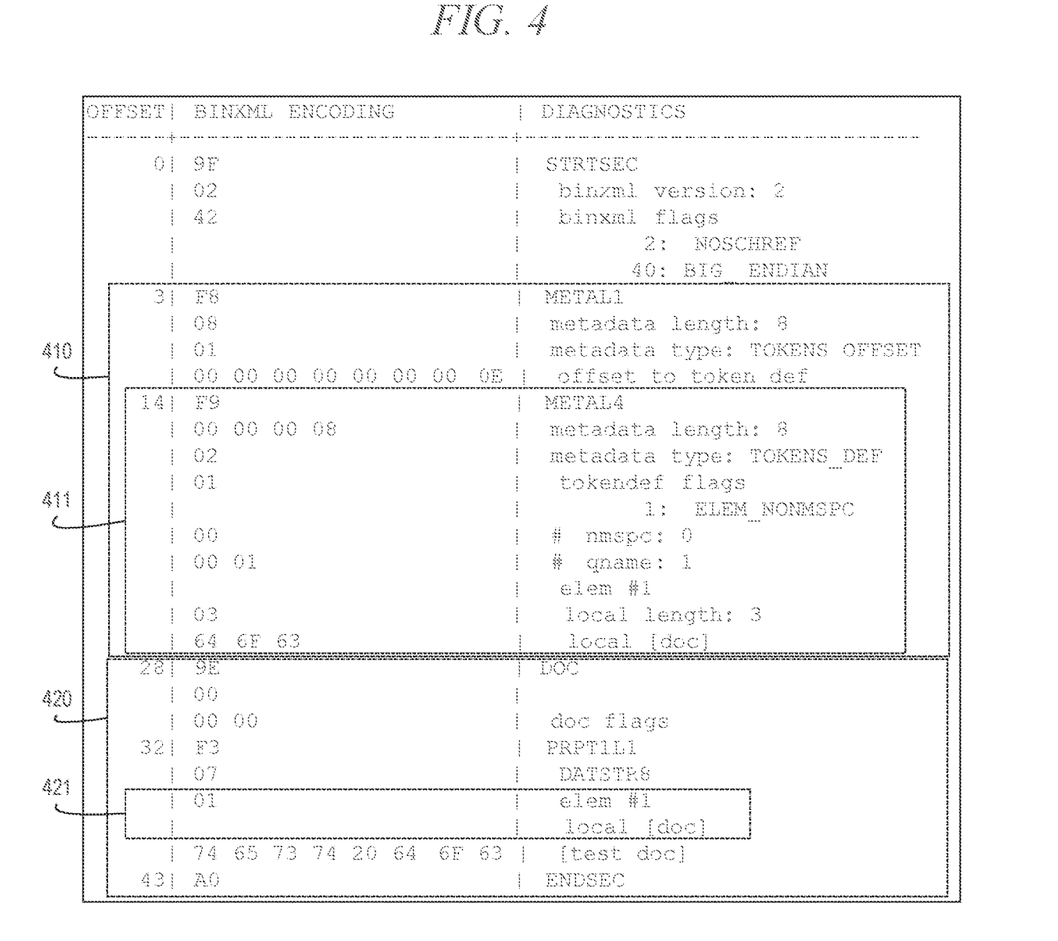
FIG. 4 depicts an example encoded Transportable binary XML object instance in accordance with an illustrative embodiment.

FIG. 4 depicts an example encoded Transportable Binary XML object in accordance with an illustrative embodiment. The example shown in FIG. 4 represents the same XML document as represented in FIG. 2. The resulting encoding in hexadecimal is as follows: 9F 02 42 F8 08 01 00 00 00 00 00 00 00 0E F9 00 00 00 08 02 01 00 00 01 03 64 6F 63 9E 00 00 F3 07 01 74 65 73 74 20 64 6F 63 A0.

Figure 5B:
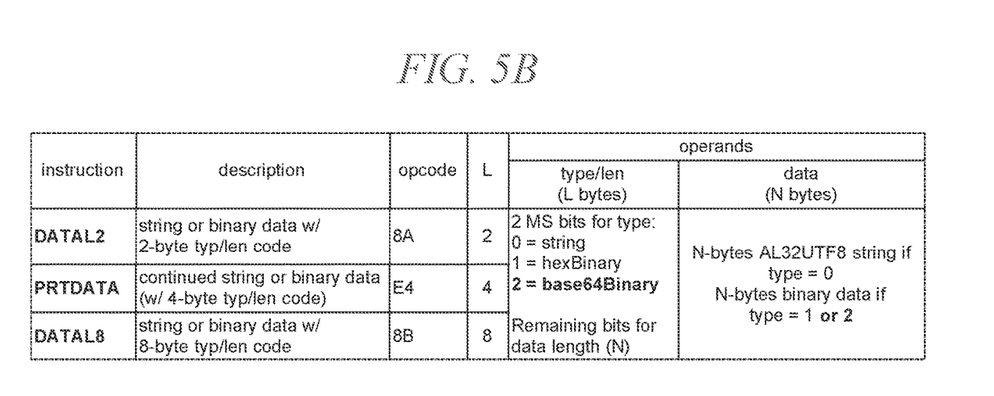
FIG. 5B is a table describing variable-length data instructions for the TBX storage format in accordance with an illustrative embodiment.

The encoded document includes opcodes, flags, and properties to represent metadata for the document, such as version, number of bytes in a section, and the like. TBX opcodes and operands are shown in FIGS. 5A-5D, which are supplemented to support the TBX storage format. FIG. 5A is a table describing fixed-length data instructions for the TBX storage format in accordance with an illustrative embodiment. FIG. 5B is a table describing variable-length data instructions for the TBX storage format in accordance with an illustrative embodiment. FIG. 5C is a table describing document and metadata instructions for the TBX storage format in accordance with an illustrative embodiment. FIG. 5D is a table describing property instructions for the TBX storage format in accordance with an illustrative embodiment.

In the example shown in FIG. 4, metadata is encoded from offset 0 to 27, and the document is encoded from offset 28 to offset 43. The encoded object starts with the opcode 9F. As shown in FIG. 5C, opcode 9F indicates the STRTSEC instruction for the start of an encoding section. This opcode has one byte (02) for the version type and one byte (42) for flags. For the TBX storage format, the flags for no schema reference and big-endian encoding are always on.

Next, the inline dictionary 410 begins at offset 3 with opcode F8. As shown FIG. 5C, opcode F8 indicates the METAL 1 instruction for metadata. This opcode has one byte for length (N=08), a one-byte metadata type (01 for offset to token definitions), and an N-byte integer for the offset (00 00 00 00 00 00 00 0E). Thus, token definition 411 begins at an offset of 0E or 14.

Token definition 411 begins at offset 14 with opcode F9. As shown in FIG. 5C, opcode F9 indicates the METAL 4 instruction for metadata. This opcode has four bytes for length (N=00 00 00 08), a one-byte metadata type (02 for token definition), and N bytes for the token definition metadata. In the example depicted in FIG. 4, the token definition includes a token, a namespace, a qname, a tag length, and a tag. The N=8 bytes for the token definition metadata begins with 01 for the one-byte token, 00 for the namespace, 00 01 for the qname, a local length of L=03, and an L-byte tag, in this case 64 6F 63 for "doc" or <doc></doc>.

The document 420 starts at offset 28 with the opcode 9E. As shown in FIG. 5C, opcode 9E indicates the DOC instruction for the start of an XML document. This opcode has one byte for length (always 00) and two bytes (00 00) for flags. Next, the <doc></doc> tags and corresponding content start with the opcode F3. As shown in FIG. 5D, opcode F3 indicates the PRPT1L1 instruction for a leaf property with a single-byte DAT opcode, a 1-byte token ID, and a data operand corresponding to the DAT opcode. The single-byte DAT opcode is 07, which according to the table in FIG. 5A, is a DATSTR8 instruction for a string. The 07 opcode has an 8-byte string in AL32UTF8 character set.

In the depicted example, document 420 includes token 421. As seen in FIG. 4, the 1-byte token ID is 01, associated with element #1, "doc," as defined by the token definition 411. The content "test doc" is encoded as text with 74 being the letter "t", 65 being the letter "e", 73 being the letter "s", and so on. Finally, the document ends with opcode A0, which according to the table in FIG. 5C, indicates the ENDSEC instruction for the end of the encoding section.

Storage Optimizations

Because the token dictionary 311 is inlined within TBX object 310 and only represents the tokens in encoded document 312, inline token dictionary 311 has the potential to increase the size of TBX object 310. For example, the CSX example in FIG. 2 is 20 bytes, and the TBX example in FIG. 4 is 44 bytes. This is with the token being two bytes in the CSX example and only one byte in the TBX example. However, if the tag repeats a significant number of times, the savings in storage may result in a smaller TBX storage size. Also, if there are many tokens for tags/attributes with longer names, up to 255 such tokens, the savings from the single-byte tokens may offset the size of the inline dictionary.

In previous solutions, such as the CSX storage format, tokens are restricted to two, four, or eight bytes. This is because the size of the centralized token repository is limited to the size of the token, and single-byte tokens would be insufficient to represent all tokens in all documents. On the other hand, with a document-level encoding granularity, one-byte tokens will be sufficient for most documents. Thus, each token can be represented using the UB1 datatype to store an unsigned value of one byte. This results in significant savings in storage space.

Another optimization is to recognize when a text value (a leaf value) in a document is a number, date, or timestamp and using an appropriate datatype to store that value. Thus, one embodiment evaluates leaf values and detects when a given value is a number, date, or timestamp. The value is then represented in the encoded document using the corresponding datatype instruction, such as binary number, decimal number, integer, unsigned integer, floating-point number, date, timestamp, timestamp with time zone, or Boolean. FIG. 5A illustrates opcodes for these datatype instructions. This represents significant savings in storage space. For example, the number 65,499 can be stored as five or six text characters, each using at least one byte, depending on the text encoding; however, the number 65,499 can be stored as a two-byte integer using opcode 76 indicating the DATINT [2] instruction with a 2-byte integer as data, thus reducing the five or six text characters to three bytes. The larger the number, the greater the savings in storage space. Therefore, detecting and converting values to the appropriate datatype can result in significant savings in storage.

Token Cache

Even with a smaller inline token dictionary, scanning the dictionary to map between tags/attributes and tokens may become a bottleneck. For example, for each tag referenced in a query, the database system must scan the dictionary to determine the associated token and then scan the document for each occurrence of the token. However, there may be many instances of a given token being associated with the same tag between documents, in which case, scanning the inline token dictionary is inefficient.

Returning to FIG. 3, the database system performs access 350 on TBX object 310 using token cache 330. The first time a tag/attribute is encountered, the database system must scan each token definition in the inline token dictionary 311 until the token definition for that tag/attribute is encountered. The database system can then use that token to perform the access 350. The database system then creates an entry in token cache 330 associating the tag/attribute with its corresponding token.

The next time the tag/attribute is encountered, with a different document, such as TBX object 320, the database system looks up token cache 330 to determine the token associated with the tag/attribute. The database system can then go directly to that token in the inline token dictionary in TBX object 320 to determine whether the tag/attribute is associated with the identified token in TBX object 320. For example, token 01 may be associated with the <doc> tag in TBX object 310, but token 01 may be associated with the <customer> tag in TBX object 320. The database system may then update the appropriate entry in token cache 330 so that token 01 is now associated with the <customer> tag.

In this manner, token cache 330 stores entries for the most recently accessed token definitions for all TBX objects. In one embodiment, token cache 330 may use a hash table to look up a tag/attribute to determine the corresponding token. In some embodiments, token cache 330 is restricted in size to save memory. Thus, when a new tag/attribute is encountered, token cache 330 uses a cache replacement algorithm, such as least recently used (LRU), least frequently used (LFU), first in first out (FIFO), or random replacement (RR).

Figure 6:
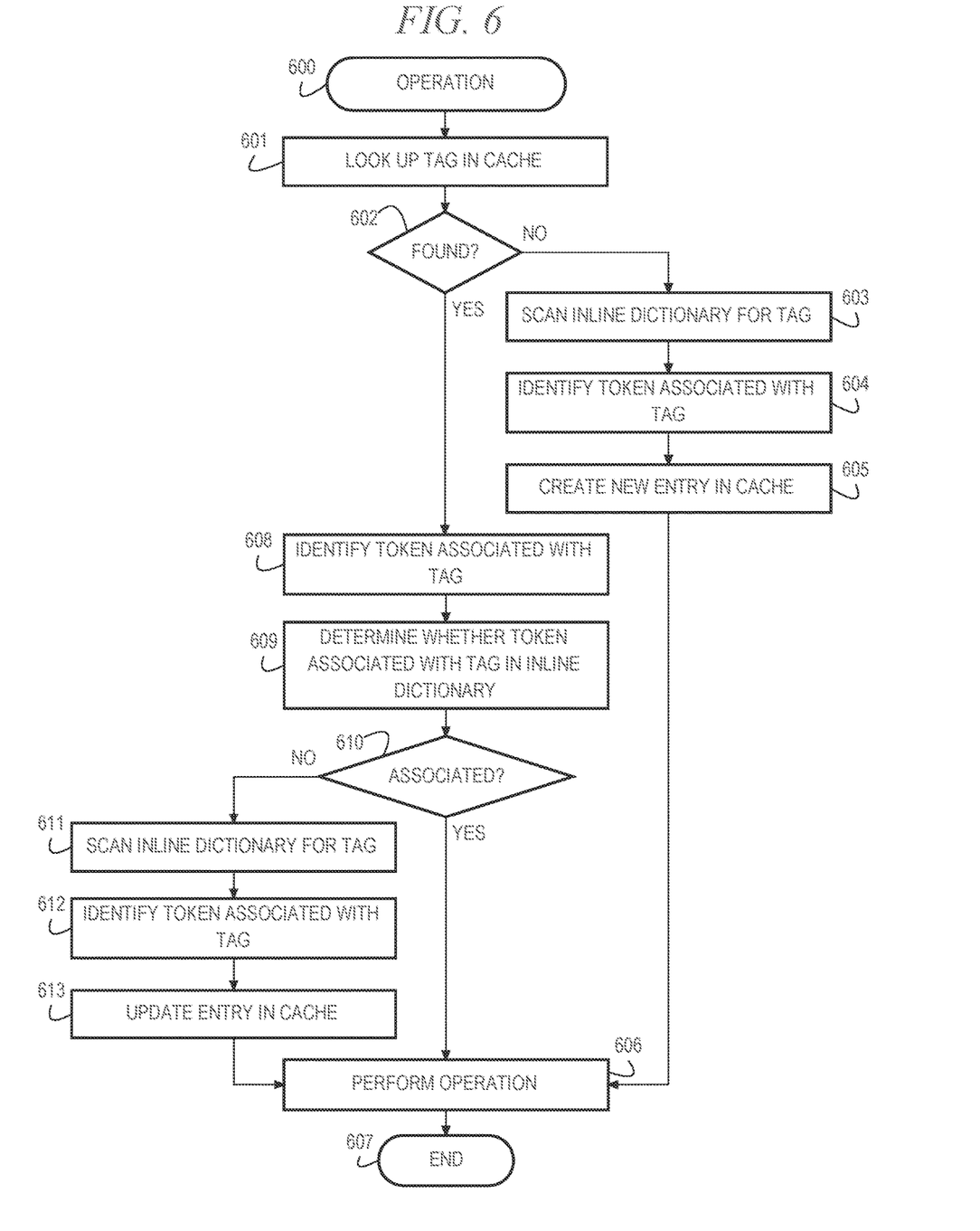
FIG. 6 is a flowchart illustrating performing a query using a token cache in accordance with an illustrative embodiment.

FIG. 6 is a flowchart illustrating how to perform a query using a token cache in accordance with an illustrative embodiment. The query begins with an operation that references a tag (block 600). The operation may be a database DDL, for example. The database system looks up the tag in the token cache (block 601) and determines if the tag is found in the token cache (block 602). If the tag is not found in the token cache (block 602: NO), then the database system scans the inline dictionary for the tag (block 603), identifies the token associated with the tag (block 604), and creates a new entry in the cache associating the tag and the identified token (block 605). Thereafter, the database system performs the operation using the identified token (block 606), and operation ends (block 607).

If the tag is found in the token cache (block 602: YES), then the database system identifies the token associated with the tag (block 608) and consults the inline token dictionary to determine whether the identified token is associated with the tag (block 609). The database system determines whether the identified token is associated with the tag in the inline token dictionary (block 610). If the identified token is associated with the tag (block 610: YES), then the database system performs the operation using the identified token (block 606), and operation ends (block 607).

If the identified token is not associated with the tag in the inline dictionary (block 610: NO), then the database system scans the inline dictionary for the tag (block 611), identifies the token associated with the tag (block 612), and updates the entry in the cache top associate the tag with the token identified in the inline dictionary (block 612). Thereafter, the database system performs the operation using the identified token (block 606), and operation ends (block 607).

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
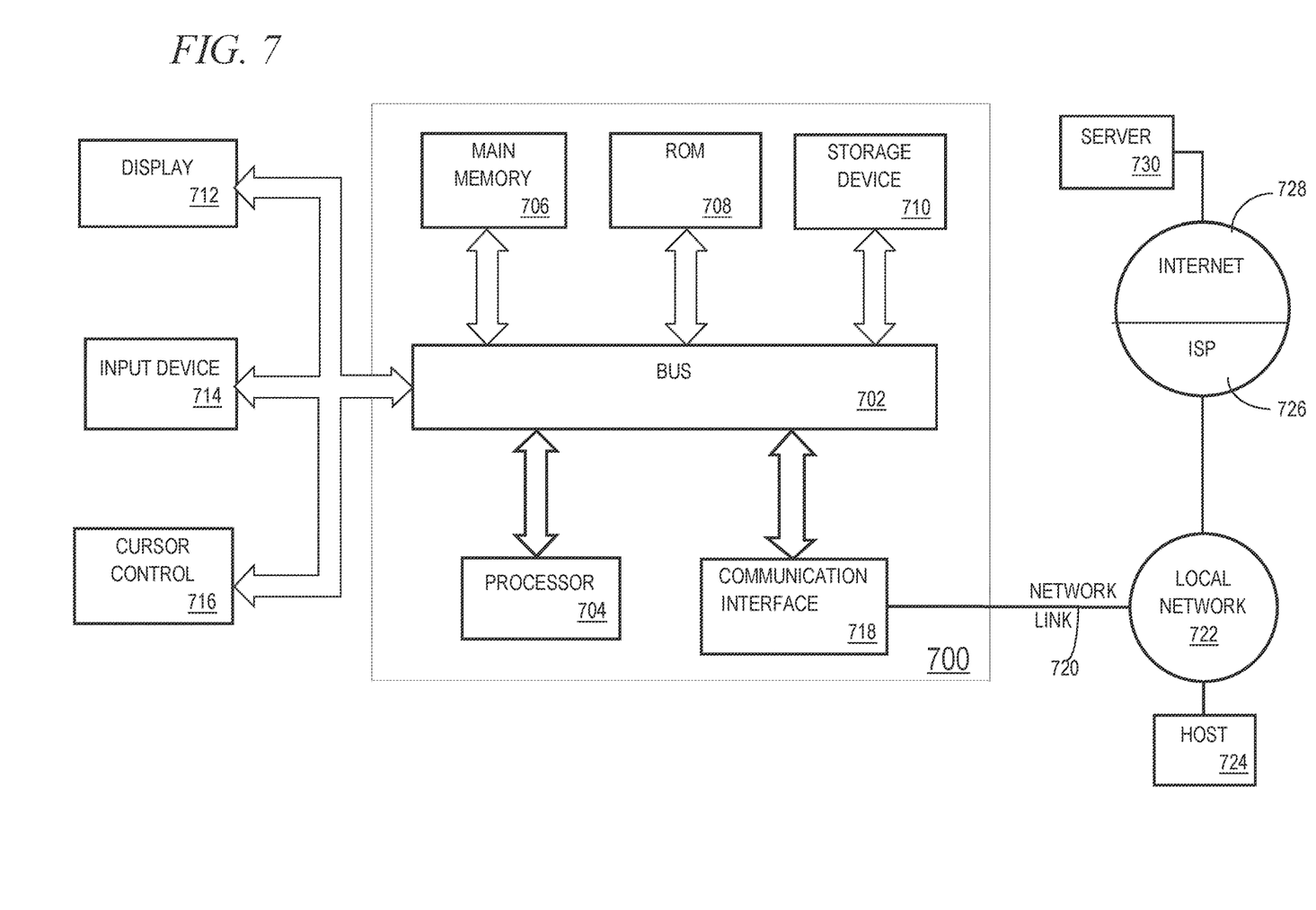
FIG. 7 is a block diagram that illustrates a computer system upon which aspects of an illustrative embodiment may be implemented.

For example, FIG. 7 is a block diagram that illustrates a computer system 700 upon which aspects of an illustrative embodiment may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

Software Overview

Figure 8:
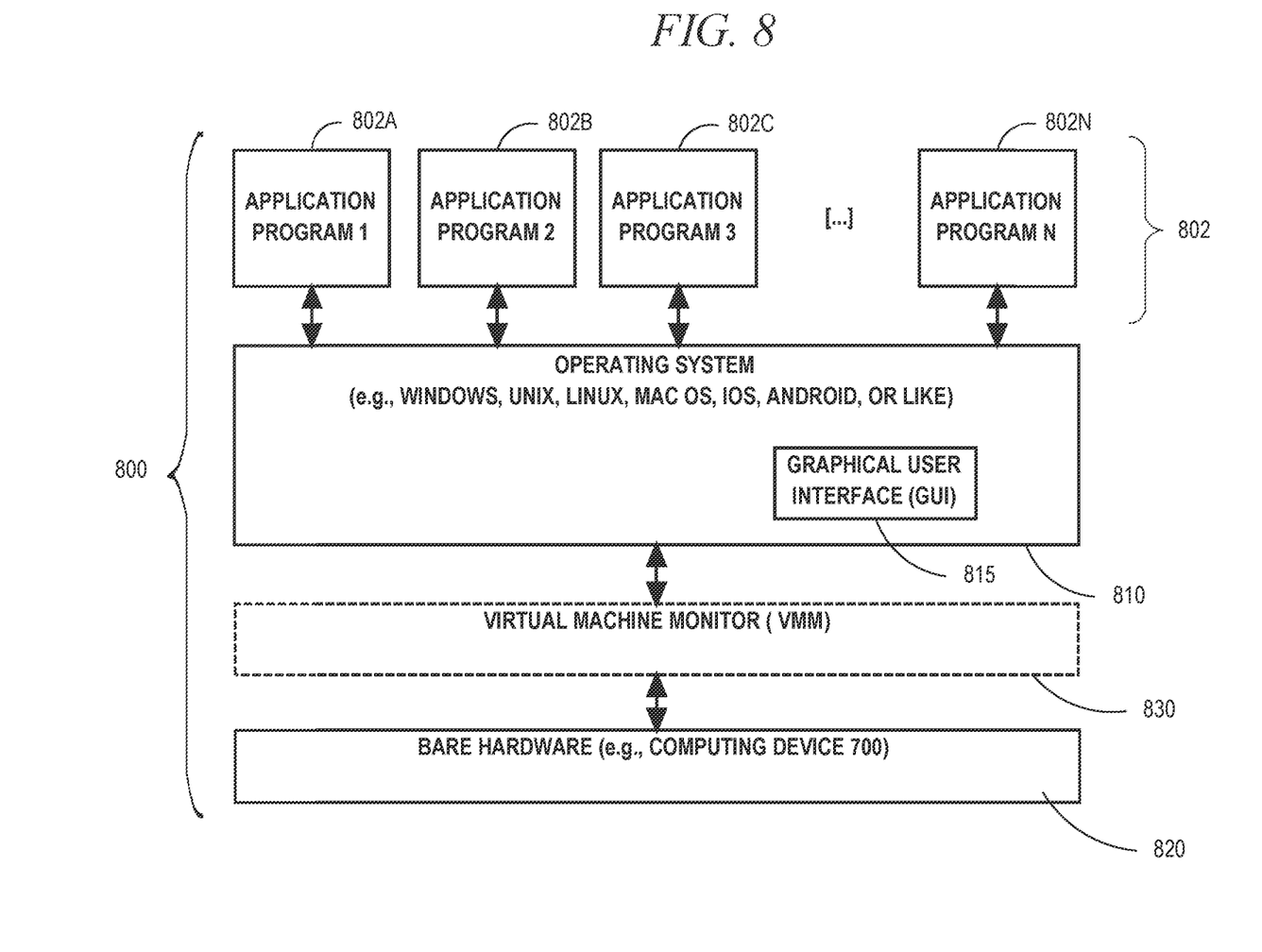
FIG. 8 is a block diagram of a basic software system that may be employed for controlling the operation of a computer system upon which aspects of the illustrative embodiments may be implemented.

FIG. 8 is a block diagram of a basic software system 800 that may be employed for controlling the operation of computer system 800 upon which aspects of the illustrative embodiments may be implemented. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing a document into a database, wherein:
        the document is in a binary structured format,
        the document contains, within the document, an inline dictionary comprising one or more token definitions, and
        each token definition specifies a mapping of a token to a tag/attribute in the document; and
    performing an operation based on a statement involving the document, wherein performing the operation comprises, for a particular tag/attribute referenced in the statement:
        looking up the particular tag/attribute in a cache of dictionary mapping entries populated with one or more token-to-tag/attribute mappings from at least one other document, wherein the particular tag/attribute appears in a cache entry of the cache;
        responsive to the particular tag/attribute appearing in a cache entry of the cache, identifying a token associated with the particular tag/attribute in the cache entry;
        looking up the identified token in the inline dictionary, wherein the identified token is associated with the particular tag/attribute in the inline dictionary; and
        responsive to the identified token being associated with the particular tag/attribute in the inline dictionary, using the identified token to perform the operation for the particular tag/attribute with respect to the document,
    wherein the method is performed by one or more computing devices.

2. The method of claim 1, wherein performing the operation further comprises for a second tag/attribute referenced in the statement:
    looking up the second tag/attribute in the cache, wherein the second tag/attribute appears in a particular cache entry of the cache entry of the cache;
    responsive to the second tag/attribute appearing in the particular cache entry, identifying a second token associated with the second tag/attribute in the particular cache entry;
    looking up the second token in the inline dictionary, wherein the second token is not associated with the second tag/attribute in the inline dictionary;
    responsive to the second token not being associated with the second tag/attribute in the inline dictionary, scanning the inline dictionary to determine an associated token for the second tag/attribute; and
    using the associated token to perform the operation for the second tag/attribute with respect to the document.

3. The method of claim 2, further comprising updating the particular cache entry with the associated token for the second tag/attribute.

4. The method of claim 1, wherein performing the operation further comprises for a second tag/attribute referenced in the statement:
    looking up the second tag/attribute in the cache, wherein the second tag/attribute does not appear in the cache;
    responsive to the second tag/attribute not appearing in the cache, scanning the inline dictionary to determine an associated token for the second tag/attribute; and
    creating a new entry in the cache associating the second tag/attribute with the associated token.

5. The method of claim 1, wherein a value associated with the particular tag/attribute in the document is a valid number and is stored as a numeric datatype in the document.

6. The method of claim 1, wherein at least one token in the document is a single-byte token.

7. The method of claim 1, wherein the inline dictionary comprises a token definition metadata opcode indicating a beginning of token definition metadata, a number of bytes of the one or more token definitions, and the one or more token definitions.

8. The method of claim 7, wherein the inline dictionary further comprises a tokens offset metadata opcode, a number of bytes of a token offset, and an offset value specifying a number of bytes to the beginning of the token definition metadata.

9. The method of claim 1, wherein each of the one or more token definitions specifies a token ID, a length, and the tag/attribute name.

10. The method of claim 9, wherein:
the document comprises a document opcode indicating a beginning of document content, and
the document content refers to the particular tag using an associated namespace token ID.

11. The method of claim 1, wherein the document is in a binary extensible markup language (XML) format and stored in a Binary XML table.

12. The method of claim 1, wherein the document is stored in an XMLType column of a database table.

13. The method of claim 1, further comprising:
storing a second document into the database, wherein:
the second document is in the binary structured format,
the second document contains, within the second document, an inline dictionary comprising one or more token definitions, and
each of the one or more token definitions in the second document specifies a mapping of a token to a tag/attribute in the document; and
performing a second operation based on a second statement involving the second document, wherein performing the second operation comprises, for a given tag/attribute referenced in the second statement:
looking up the given tag/attribute in the cache, wherein the given tag/attribute appears in a particular cache entry of the cache;
responsive to the given tag/attribute appearing in the particular cache entry of the cache, identifying a second token associated with the given tag/attribute in the particular cache entry;
looking up the second token in the inline dictionary, wherein the second token is associated with the particular tag/attribute in the inline dictionary; and
responsive to the second token being associated with the given tag/attribute in the inline dictionary in the second document, using the second token to perform the operation for the given tag/attribute with respect to the second document.

14. One or more non-transitory storage media storing instructions which, when executed by one or more computing devices, cause:
storing a document into a database, wherein:
the document is in a binary structured format,
the document contains, within the document, an inline dictionary comprising one or more token definitions, and
each token definition specifies a mapping of a token to a tag/attribute in the document; and
performing an operation based on a statement involving the document, wherein performing the operation comprises, for a particular tag/attribute referenced in the statement:
looking up the particular tag/attribute in a cache of dictionary mapping entries populated with one or more token-to-tag/attribute mappings from at least one other document, wherein the particular tag/attribute appears in a cache entry of the cache;
responsive to the particular tag/attribute appearing in a cache entry of the cache, identifying a token associated with the particular tag/attribute in the cache entry;
looking up the identified token in the inline dictionary, wherein the identified token is associated with the particular tag/attribute in the inline dictionary; and
responsive to the identified token being associated with the particular tag/attribute in the inline dictionary, using the identified token to perform the operation for the particular tag/attribute with respect to the document.

15. The one or more non-transitory storage media of claim 14, wherein performing the operation further comprises for a second tag/attribute referenced in the statement:
looking up the second tag/attribute in the cache, wherein the second tag/attribute appears in a particular cache entry of the cache;
responsive to the second tag/attribute appearing in the particular cache entry, identifying a second token associated with the second tag/attribute in the particular cache entry;
looking up the second token in the inline dictionary, wherein the second token is not associated with the second tag/attribute in the inline dictionary;
responsive to the second token not being associated with the second tag/attribute in the inline dictionary, scanning the inline dictionary to determine an associated token for the second tag/attribute; and
using the associated token to perform the operation for the second tag/attribute with respect to the document.

16. The one or more non-transitory storage media of claim 15, wherein the instructions further cause updating the particular cache entry with the associated token for the second tag/attribute.

17. The one or more non-transitory storage media of claim 14, wherein performing the operation further comprises for a second tag/attribute referenced in the statement:
looking up the second tag/attribute in the cache, wherein the second tag/attribute does not appear in the cache;
responsive to the second tag/attribute not appearing in the cache, scanning the inline dictionary to determine an associated token for the second tag/attribute; and
creating a new cache entry in the cache associating the second tag/attribute with the associated token.

18. The one or more non-transitory storage media of claim 14, wherein a value associated with the particular tag/attribute in the document is a valid number and is stored as a numeric datatype in the document.

19. The one or more non-transitory storage media of claim 14, wherein at least one token in the document is a single-byte token.

20. The one or more non-transitory storage media of claim 14, wherein the inline dictionary comprises a token definition metadata opcode indicating a beginning of token definition metadata, a number of bytes of the one or more token definitions, and the one or more token definitions.

* * * * *